(12) United States Patent
Fukushima et al.

(10) Patent No.: US 10,008,220 B2
(45) Date of Patent: Jun. 26, 2018

(54) MAGNETIC RECORDING MEDIUM AND MAGNETIC MEMORY DEVICE INCLUDING MAGNETIC LAYERS HAVING GRANULAR STRUCTURE OF MAGNETIC GRAINS AND GRAIN BOUNDARY PORTION

(71) Applicant: SHOWA DENKO K.K., Tokyo (JP)

(72) Inventors: Takayuki Fukushima, Chiba (JP); Yuji Murakami, Chiba (JP); Tetsuya Kanbe, Chiba (JP); Lei Zhang, Chiba (JP); Kazuya Niwa, Chiba (JP); Hisato Shibata, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 16 days.

(21) Appl. No.: 15/596,109

(22) Filed: May 16, 2017

(65) Prior Publication Data
US 2017/0365279 A1 Dec. 21, 2017

(30) Foreign Application Priority Data
Jun. 15, 2016 (JP) .................................. 2016-119260

(51) Int. Cl.
*G11B 5/82* (2006.01)
*G11B 5/187* (2006.01)
(Continued)

(52) U.S. Cl.
CPC ............ *G11B 5/1875* (2013.01); *G11B 5/398* (2013.01); *G11B 5/65* (2013.01); *G11B 5/66* (2013.01); *G11B 5/706* (2013.01); *G11B 5/70615* (2013.01); *G11B 5/716* (2013.01); *G11B 5/73* (2013.01); *G11B 5/743* (2013.01); *G11B 5/8404* (2013.01); *G11B 5/855* (2013.01)

(58) Field of Classification Search
CPC ..... G11B 5/716; G11B 5/742; G11B 5/70615; G11B 5/855

USPC ......................................................... 360/135
See application file for complete search history.

(56) References Cited

U.S. PATENT DOCUMENTS

| 2015/0021175 A1* | 1/2015 | Arakawa | G11B 5/851 |
| | | | 204/298.13 |
| 2015/0093598 A1* | 4/2015 | Kubota | G11B 5/647 |
| | | | 428/831.2 |

(Continued)

FOREIGN PATENT DOCUMENTS

| JP | 2015-001996 | 1/2015 |
| JP | 2015-175025 | 10/2015 |

OTHER PUBLICATIONS

En Yang et al. "L10 FePt-oxide columnar perpendicular media with high coercivity and small grain size", Journal of Applied Physics 104, 023904 (Jul. 2008).

(Continued)

*Primary Examiner* — Jefferson Evans
(74) *Attorney, Agent, or Firm* — IPUSA, PLLC

(57) ABSTRACT

A magnetic recording medium includes a substrate; a lower base layer formed on the substrate; and a (001) oriented $L1_0$ magnetic layer formed on the lower base layer and including a first magnetic layer formed on the lower base layer and having a granular structure of magnetic grains and a grain boundary portion, the grain boundary portion containing C, and a second magnetic layer formed on the first magnetic layer and having a granular structure of magnetic grains and a grain boundary portion, the grain boundary portion containing oxide or nitride, the second magnetic layer further containing one or more elements selected from a group consisting of Mg, Ni, Zn, Ge, Pd, Sn, Ag, Re, Au and Pb as an additive.

10 Claims, 2 Drawing Sheets

(51) Int. Cl.
*G11B 5/706* (2006.01)
*G11B 5/74* (2006.01)
*G11B 5/716* (2006.01)
*G11B 5/855* (2006.01)
*G11B 5/39* (2006.01)
*G11B 5/66* (2006.01)
*G11B 5/73* (2006.01)
*G11B 5/84* (2006.01)
*G11B 5/65* (2006.01)

(56) References Cited

U.S. PATENT DOCUMENTS

| | | | | |
|---|---|---|---|---|
| 2015/0132608 A1* | 5/2015 | Kataoka | ............... | G11B 5/65 428/829 |
| 2015/0194175 A1* | 7/2015 | Chen | ............... | C23C 14/06 428/832 |
| 2015/0213821 A1* | 7/2015 | Ono | ............... | G11B 5/65 428/829 |
| 2016/0118071 A1* | 4/2016 | Hirotsune | ............... | G11B 5/65 360/75 |
| 2016/0225394 A1* | 8/2016 | Moriya | ............... | G11B 5/65 |
| 2016/0254017 A1* | 9/2016 | Nakata | ............... | G11B 5/65 428/828 |
| 2016/0293199 A1* | 10/2016 | Moriya | ............... | G11B 5/65 |
| 2017/0125050 A1* | 5/2017 | Kataoka | ............... | G11B 5/851 |
| 2017/0365286 A1* | 12/2017 | Uchida | ............... | G11B 5/70615 |
| 2018/0040346 A1* | 2/2018 | Moriya | ............... | G11B 5/8404 |

OTHER PUBLICATIONS

Li Zhang et al. "L10-ordered high coercivity (FePt) Ag—C granular thin films for perpendicular recording", Journal of Magnetism and Magnetic Materials 322 (2010) 2658-2664, Apr. 2010.

* cited by examiner

MAGNETIC RECORDING MEDIUM AND MAGNETIC MEMORY DEVICE INCLUDING MAGNETIC LAYERS HAVING GRANULAR STRUCTURE OF MAGNETIC GRAINS AND GRAIN BOUNDARY PORTION

CROSS-REFERENCE TO RELATED APPLICATION

The present application is based on and claims the benefit of priority of Japanese Priority Application No. 2016-119260 filed on Jun. 15, 2016, the entire contents of which are hereby incorporated by reference.

BACKGROUND OF THE INVENTION

1. Field of the Invention

The present invention relates to a magnetic recording medium and a magnetic memory device.

2. Description of the Related Art

Recently, hard disk drives (HDD) are increasingly required to be mass storage devices. In order to satisfy such a requirement, Thermally-Assisted Magnetic Recording (TAMR) is suggested by which data is recorded on a magnetic recording medium while heating the magnetic recording medium by a magnetic head on which a laser light source is mounted.

According to TAMR, as magnetic coercive force can be largely reduced by heating the magnetic recording medium, a material whose magnetic crystalline anisotropy constant $K_u$ is high (hereinafter, referred to as a "high $K_u$ magnetic material" as well) can be used for a magnetic layer of the magnetic recording medium. Thus, grain-size of magnetic materials can be made fine while retaining heat stability, and a surface density of about 1 Tbit/inch$^2$ can be achieved. As the high $K_u$ magnetic material, an ordered alloy or the like such as an $L1_0$ FePt alloy, an $L1_0$ CoPt alloy or an $L1_1$ CoPt alloy is raised.

Further, it is known that oxide such as $SiO_2$ or $TiO_2$, C, BN or the like is added as a material of a grain boundary phase in the magnetic layer in order to separate crystal grains composed of the above described ordered alloy. By forming the magnetic layer to have a granular structure in which crystal grains are separated by a grain boundary phase, exchange couplings between the magnetic grains can be reduced and high medium SNR (signal-noise ratio) can be actualized. For example, Non-Patent Document 1 discloses adding 38% of $SiO_2$ in FePt. Patent Document 1 discloses using Ge oxide in a grain boundary portion of an $L1_0$ magnetic layer having a granular structure.

Further, Patent Document 2 discloses that magnetic properties are improved by adding Ag, Au, Ge, Pd or Re in a sputtering target for forming a FePt magnetic layer.

Further, Non-Patent Document 2 discloses a (FePt) Ag—C granular structure as an $L1_0$ thin film with high magnetic coercive force.

However, it is still required to improve a recording volume of a magnetic recording medium. Thus, a magnetic recording medium having good electromagnetic transducing properties, in particular, having good SNR is required.

PATENT DOCUMENTS

[Patent Document 1] Japanese Laid-open Patent Publication No. 2015-1996

[Patent Document 2] Japanese Laid-open Patent Publication No. 2015-175025

NON-PATENT DOCUMENTS

[Non-Patent Document 1] "$L1_0$ FePt-oxide columnar perpendicular media with high coercivity and small grain size", En Yang and David E. Laughlin, Journal of Applied Physics 104, 023904 (2008)

[Non-Patent Document 2] "$L1_0$-ordered high coercivity (FePt)Ag—C granular thin films for perpendicular recording", Li Zhang, Y. K. Takahashi, A. Perumal, K. Hono, Journal of Magnetism and Magnetic Materials 322 (2010) 2658-2664

SUMMARY OF THE INVENTION

The present invention is made in light of the above problems, and provides a magnetic recording medium having high SNR compared with a conventional one.

According to an embodiment, there is provided a magnetic recording medium including a substrate; a lower base layer formed on the substrate; and a (001) oriented $L1_0$ magnetic layer formed on the lower base layer and including a first magnetic layer formed on the lower base layer and having a granular structure of magnetic grains and a grain boundary portion, the grain boundary portion containing C, and a second magnetic layer formed on the first magnetic layer and having a granular structure of magnetic grains and a grain boundary portion, the grain boundary portion containing oxide or nitride, the second magnetic layer further containing one or more elements selected from a group consisting of Mg, Ni, Zn, Ge, Pd, Sn, Ag, Re, Au and Pb as an additive.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

Figure 1:
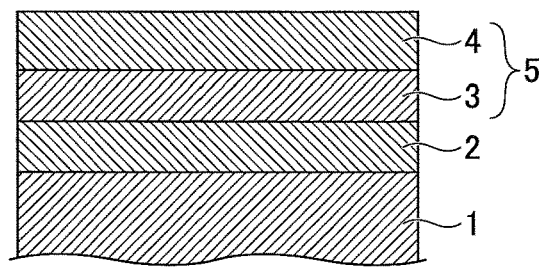
FIG. 1 is a cross-sectional view schematically illustrating an example of a magnetic recording medium of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

An example of a structure of a magnetic recording medium of an embodiment is described with reference to FIG. 1.

The magnetic recording medium of the embodiment includes a substrate 1, a lower base layer 2, and a magnetic layer 5 formed in this order. The magnetic layer 5 has a (001) oriented $L1_0$ structure. The magnetic layer 5 includes a first magnetic layer 3 and a second magnetic layer 4 formed in this order from a substrate 1 side. The first magnetic layer 3 has a granular structure including magnetic grains and a grain boundary portion. The first magnetic layer 3 contains C (carbon) at the grain boundary portion of its magnetic grains. The second magnetic layer 4 has a granular structure including magnetic grains and a grain boundary portion. The second magnetic layer 4 contains oxide or nitride at the grain boundary portion of its magnetic grains. The second magnetic layer 4 further contains one or more elements selected from a group consisting of Mg, Ni, Zn, Ge, Pd, Sn, Ag, Re, Au and Pb.

According to the magnetic recording medium of the embodiment, by adopting such a configuration, separation of the magnetic grains is promoted and (001) orientation of the $L1_0$ magnetic layer 5 is increased. Thus, when the magnetic recording medium is used in a magnetic memory device, SNR can be increased.

The present inventors consider the reason why the SNR is increased by the above configuration as follows. The first magnetic layer 3 is an initial layer of the granular structure, and it is required for the first magnetic layer 3 to have high orientation and high ordered degree, and further, it is also required that separation between the magnetic grains and the grain boundary is good in the first magnetic layer 3. The carbon C contained in the first magnetic layer 3 of the embodiment is easily separated from a magnetic material such as Fe in deposition at high temperature, for example, greater than or equal to 500° C., more preferably, within a range greater than or equal to 500° C. and less than or equal to 600° C., and forms the good grain boundary portion. Then, as the magnetic grains of the second magnetic layer 4 formed thereon grow one-on-one from the magnetic grains of the first magnetic layer 3, the second magnetic layer 4 can inherit the good separation property of the first magnetic layer 3.

Further, according to the magnetic recording medium of the embodiment, the granular structure in which the grain boundary portion contains oxide or nitride is adopted for the second magnetic layer 4. Such a magnetic layer can be deposited at low temperature, for example, less than 500° C., more preferably, greater than or equal to 300° C. and less than 500° C., compared with a case when a grain boundary portion contains C, (001) orientation and the ordered degree of the $L1_0$ magnetic grains can be improved.

Further, in this embodiment, the second magnetic layer 4 contains, as an additional element, one or more elements selected from a group consisting of Mg, Ni, Zn, Ge, Pd, Sn, Ag, Re, Au and Pb, more preferably, selected from a group consisting of Mg, Ge, Pd and Ag. Such an additional element has a function to directly affect the $L1_0$ magnetic grains to improve the (001) orientation and the ordered degree of the magnetic grains.

As described above, as the magnetic layer 5 of the embodiment includes the first magnetic layer 3 and the second magnetic layer 4, the (001) orientation is high and the ordered degree is also high, and the separation between the magnetic grains and the grain boundary is good. Therefore, when the magnetic layer 5 is used in the magnetic memory device, SNR can be improved.

In this embodiment, it is preferable that the second magnetic layer 4 does not contain C at the grain boundary portion. C may bond the magnetic material such as Fe when being deposited at low temperature. With this, the (001) orientation and the ordered degree of the magnetic grains may be lowered.

In this embodiment, it is preferable that the second magnetic layer 4 does not contain oxide of any of Mg, Ni, Zn, Ge, Pd, Sn, Ag, Re, Au and Pb in the grain boundary portion. As described above, each of Mg, Ni, Zn, Ge, Pd, Sn, Ag, Re, Au and Pb has a function to directly affect the $L1_0$ magnetic grains to improve the (001) orientation and the ordered degree of the magnetic grains, if such an additional element is oxidized and forms the grain boundary layer, the function to affect the magnetic grains is lowered and the effect of improving the (001) orientation and the ordered degree of the magnetic grains may be lowered.

In this embodiment, it is preferable that an adding amount of the additional element in the second magnetic layer 4 is within a range greater than or equal to 0.5 mol % and less than or equal to 20 mol %. With this range, the (001) orientation and the ordered degree of the magnetic grains can be further improved.

In this embodiment, it is preferable that the thickness of the second magnetic layer 4 is within a range greater than or equal to 1 nm and less than or equal to 7 nm. With this range, the (001) orientation and the ordered degree of the magnetic grains can be further improved.

In this embodiment, by configuring the (001) oriented $L1_0$ magnetic layer to contain FePt alloy or CoPt alloy as a main constituent, the (001) oriented $L1_0$ magnetic layer can have a high magnetic crystalline anisotropy constant Ku.

In this embodiment, it is preferable that one or more materials selected from a group consisting of $SiO_2$, $TiO_2$, $Cr_2O_3$, $Al_2O_3$, $Ta_2O_5$, $ZrO_2$, BN, $Si_3N_4$ and $B_2O_3$ are used as the oxide or the nitride contained in the grain boundary portion of the second magnetic layer 4. With this configuration, exchange couplings between crystal grains can be surely prevented, and SNR can be increased when being used in the magnetic memory device.

As the substrate 1 of the magnetic recording medium of the embodiment, a known substrate may be used. As it is necessary to heat the substrate 1 at temperature greater than or equal to 500° C. in manufacturing steps of the magnetic recording medium of the embodiment, as the substrate 1, a heat-resistant glass substrate whose softening temperature is greater than or equal to 500° C., preferably, greater than or equal to 600° C. may be used, for example.

As the lower base layer 2 of the magnetic recording medium of the embodiment, a layer appropriate to orient the $L1_0$ magnetic layer to (001) orientation may be used. As such a lower base layer, (100) oriented W or MgO may be used, for example.

Further, the lower base layer 2 of the magnetic recording medium of the embodiment may be a multi-layered structure. In such a case, it is preferable that lattice misfit between the plurality of lower base layers is less than or equal to 10%. As such a lower base layer, for example, a multi-layered structure of the above described (100) oriented W or MgO may be used. Further, in order to surely orient such a lower base layer to have (100) orientation, Cr, a BCC alloy containing Cr as a main constituent, or a B2 alloy may be used thereunder. Here, as the BCC alloy containing Cr as a main constituent, for example, CrMn, CrMo, CrW, CrV, CrTi, CrRu or the like may be used. Further, as the B2 alloy, for example, RuAl, NiAl or the like may be used.

In the magnetic recording medium of the embodiment, it is preferable that a DLC protection film (not illustrated in the drawings) is formed on the magnetic layer 5.

A method of forming the DLC protection film is not specifically limited. However, for example, RF-CVD (Radio Frequency-Chemical Vapor Deposition) in which a film is formed by decomposing source gas composed of hydrocarbon by radio-frequency plasma, IBD (Ion Beam Deposition) in which a film is formed by ionizing source gas by electron discharged from a filament, FCVA (Filtered Cathodic Vacuum Arc) in which a film is formed using a solid C target, without using source gas, or the like may be used.

The thickness of the DLC protection film is not specifically limited, but it is preferable that the thickness is within a range greater than or equal to 1 nm and less than or equal to 6 nm, for example. By setting the thickness to be greater than or equal to 1 nm, floating characteristics of the magnetic head can be retained. Further, by setting the thickness to be less than or equal to 6 nm, magnetic spacing can be reduced and medium SNR can be retained.

A lubricant composed of perfluoropolyether-based fluororesin may be further coated on the DLC protection film.

The magnetic memory device of the embodiment includes the above described magnetic recording medium of the embodiment.

The magnetic memory device may include, for example, a magnetic recording medium drive unit for rotating a magnetic recording medium, a magnetic head including at its front end portion a near field light generation element, a magnetic head drive unit for moving the magnetic head and a recording and reproducing signal processing system. Further, the magnetic head may include a laser generation unit for heating the magnetic recording medium and a waveguide that leads laser light generated at the laser generation unit to the near field light generation element.

Figure 2:
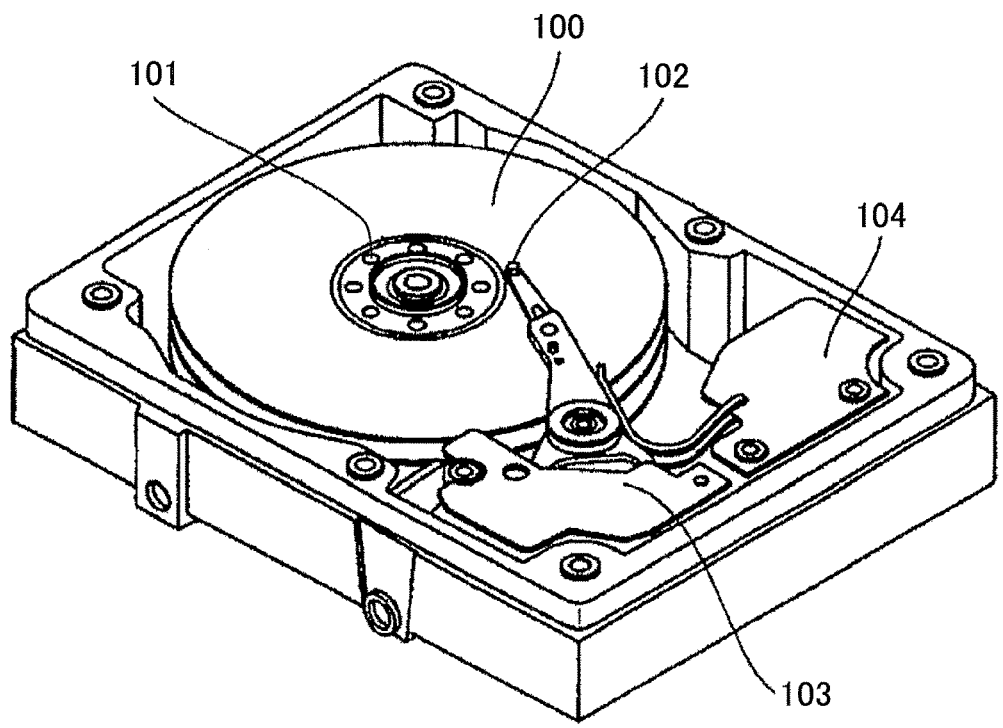
FIG. 2 is a schematic view illustrating an example of a magnetic memory device of the embodiment.

A specific example of a structure of the magnetic memory device is illustrated in FIG. 2. The magnetic memory device includes a magnetic recording medium 100, a magnetic recording medium drive unit 101 for rotating the magnetic recording medium 100, a magnetic head 102, a magnetic head drive unit 103 for moving the magnetic head 102, a recording and reproducing signal processing system 104 and the like.

Figure 3:
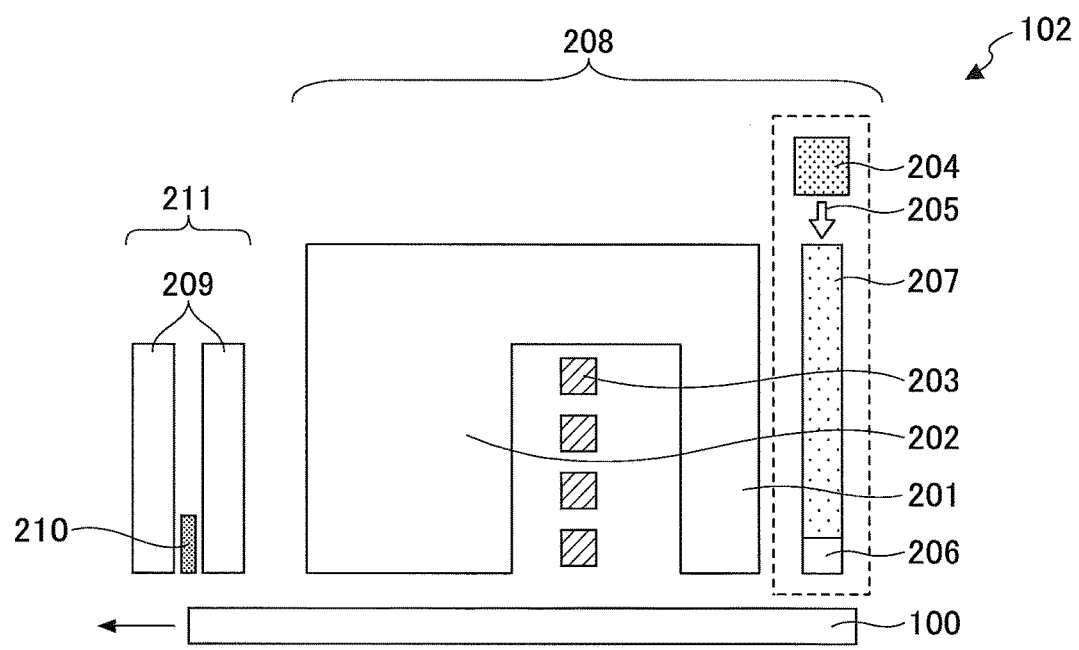
FIG. 3 is a schematic view illustrating an example of a magnetic head used in the magnetic memory device of the embodiment.

In this embodiment, as the magnetic head 102, a structure as illustrated in FIG. 3 may be used, for example. Specifically, the magnetic head 102 includes a recording head 208 and a reproducing head 211. The recording head 208 includes a main pole 201, an auxiliary magnetic pole 202, a coil 203 for generating a magnetic field, a laser diode (LD) 204, which functions as a laser generation unit, a waveguide 207 for transmitting laser light 205 generated at the LD 204 to a near field light generation element 206 and the like. The reproducing head 211 includes a reproducing element 210 or the like sandwiched by shields 209.

Here, the magnetic recording medium of the embodiment is used as the magnetic recording medium 100. Thus, the magnetic memory device of the embodiment can have high SNR.

EXAMPLES

Hereinafter, advantages of the invention are described by examples. The present invention is not limited to the following examples.

(Examples 1 to 10 and 12 to 20 and comparative examples 1 to 4 and 6)

The magnetic recording medium in each of examples 1 to 10 and 12 to 20 and comparative examples 1 to 4 and 6 is described.

First, a lower base layer was deposited on a glass substrate of 2.5 inches. Specifically, as a first lower base layer, 50Co-50Ti (an alloy of 50 atomic % of Co and 50 atomic % of Ti, hereinafter, similarly described.) with a thickness of 50 nm was deposited on the glass substrate of 2.5 inches, and the substrate was heated at 300° C. Thereafter, 80Cr-20V with a thickness of 12 nm was deposited thereon as a second lower base layer, W with a thickness of 40 nm was deposited thereon as a third lower base layer, and MgO with a thickness of 3 nm was deposited thereon as a fourth lower base layer.

Thereafter, after heating the substrate at 520° C., a layer with a thickness of 2 nm as illustrated in Table 1 was deposited on the lower base layer as the first magnetic layer. Then, the substrate was heated at 480° C. Thereafter, a layer with a thickness of 5 nm as illustrated in Table 1 was deposited on the first magnetic layer as the second magnetic layer. Here, "60(50Fe50Pt)-40C" in Table 1 means 60 mol % of 50Fe50Pt (50 atomic % of Fe and 50 atomic % of Pt) and 40 mol % of C, hereinafter, similarly described). Thus, "84(45Fe45Pt10Mg)-16SiO$_2$" in Table 1 means 84 mol % of 45Fe45Pt10Mg (45 atomic % of Fe, 45 atomic % of Pt and 10 atomic % of Mg) and 16 mol % of SiO$_2$.

Thereafter, a DLC protection film of 3 nm was formed on the magnetic layer, and a lubricant composed of perfluoropolyether-based fluororesin of 1.2 nm was coated on the DLC protection film to manufacture the magnetic recording medium. It was confirmed by X ray diffraction that the lower base layer was a good BCC (100) oriented film, and the magnetic layer was a good (001) oriented L1$_0$ film.

Comparative Example 5

For comparative example 5, the lower base layer was a three layered structure in which Ta with a thickness of 5 nm was used as a first lower base layer, Cr with a thickness of 20 nm was used as a second lower base layer, and MnO with a thickness of 10 nm was used as a third lower base layer. Other than this, the magnetic recording medium was manufactured similarly as example 18. It was confirmed by X ray diffraction that the lower base layer was a (002) oriented film, and the magnetic layer was a (110) oriented L1$_0$ film.

SNR was measured for each of the manufactured magnetic recording media using the magnetic head illustrated in FIG. 3. The results are illustrated in Table 1.

TABLE 1

|  | FIRST MAGNETIC LAYER | SECOND MAGNETIC LAYER | SNR (dB) |
| --- | --- | --- | --- |
| EXAMPLE 1 | 60(50Fe50Pt)—40C | 84(45Fe45Pt10Mg)—16SiO$_2$ | 7.9 |
| EXAMPLE 2 | 60(50Fe50Pt)—40C | 84(45Fe45Pt10Ni)—16SiO$_2$ | 7.9 |
| EXAMPLE 3 | 60(50Fe50Pt)—40C | 84(45Fe45Pt10Zn)—16SiO$_2$ | 8.0 |
| EXAMPLE 4 | 60(50Fe50Pt)—40C | 84(45Fe45Pt10Ge)—16SiO$_2$ | 8.5 |
| EXAMPLE 5 | 60(50Fe50Pt)—40C | 84(45Fe45Pt10Pd)—16SiO$_2$ | 8.3 |
| EXAMPLE 6 | 60(50Fe50Pt)—40C | 84(45Fe45Pt10Sn)—16SiO$_2$ | 8.0 |
| EXAMPLE 7 | 60(50Fe50Pt)—40C | 84(45Fe45Pt10Ag)—16SiO$_2$ | 8.2 |

TABLE 1-continued

| | FIRST MAGNETIC LAYER | SECOND MAGNETIC LAYER | SNR (dB) |
|---|---|---|---|
| EXAMPLE 8 | 60(50Fe50Pt)—40C | 84(45Fe45Pt10Re)—16SiO$_2$ | 8.3 |
| EXAMPLE 9 | 60(50Fe50Pt)—40C | 84(45Fe45Pt10Au)—16SiO$_2$ | 8.0 |
| EXAMPLE 10 | 60(50Fe50Pt)—40C | 84(45Fe45Pt10Pb)—16SiO$_2$ | 8.1 |
| EXAMPLE 12 | 60(45Fe45Pt10Ge)—40C | 84(45Fe45Pt10Ge)—16SiO$_2$ | 7.8 |
| EXAMPLE 13 | 60(50Fe50Pt)—40C | 84(45Fe45Pt10Ge)—13SiO$_2$—3C | 8.2 |
| EXAMPLE 14 | 60(50Fe50Pt)—40C | 84(45Fe45Pt10Ge)—8SiO$_2$—8TiO$_2$ | 8.5 |
| EXAMPLE 15 | 60(50Fe50Pt)—40C | 84(45Fe45Pt10Ge)—16Cr$_2$O$_3$ | 8.4 |
| EXAMPLE 16 | 60(50Fe50Pt)—40C | 84(49.5Fe49.5Pt1Pd)—16SiO$_2$ | 8.0 |
| EXAMPLE 17 | 60(50Fe50Pt)—40C | 84(48.5Fe48.5Pt3Pd)—16SiO$_2$ | 8.1 |
| EXAMPLE 18 | 60(50Fe50Pt)—40C | 84(47.5Fe47.5Pt5Pd)—16SiO$_2$ | 8.2 |
| EXAMPLE 19 | 60(50Fe50Pt)—40C | 84(42.5Fe42.5Pt15Pd)—16SiO$_2$ | 8.1 |
| EXAMPLE 20 | 60(50Fe50Pt)—40C | 84(40Fe40Pt20Pd)—16SiO$_2$ | 8.0 |
| COMPARATIVE EXAMPLE 1 | 60(50Fe50Pt)—40C | 84(50Fe50Pt)—16SiO$_2$ | 7.6 |
| COMPARATIVE EXAMPLE 2 | 60(50Fe50Pt)—40C | 60(50Fe50Pt)—40C | 7.3 |
| COMPARATIVE EXAMPLE 3 | 84(45Fe45Pt10Ge)—16SiO$_2$ | 84(45Fe45Pt10Ge)—16SiO$_2$ | 7.2 |
| COMPARATIVE EXAMPLE 4 | 60(50Fe50Pt)—40SiO$_2$ | 84(45Fe45Pt10Ge)—16SiO$_2$ | 7.1 |
| COMPARATIVE EXAMPLE 5 | 60(50Fe50Pt)—40C (110) ORIENTATION | 84(47.5Fe47.5Pt5Pd)—16SiO$_2$ (110) ORIENTATION | 6.6 |
| COMPARATIVE EXAMPLE 6 | 60(50Fe50Pt)—40C | 84(45Fe45Pt10Ge)—8SiO$_2$—8GeO$_2$ | 8.0 |

As illustrated in Table 1, in comparative example 1, as the additive was not contained in the second magnetic layer, the SNR was not good. In comparative example 2, as the grain boundary portion of the second magnetic layer did not contain oxide or nitride and contained C, the SNR was not good. In each of comparative examples 3 and 4, as oxide was used and C was not contained in the grain boundary portion of the first magnetic layer, the SNR was not good.

On the other hand, in each of examples 1 to 10 and 12 to 20, the SNR was good. However, as can be understood from the result of comparative example 6, it was confirmed that the SNR was a bit lowered when Ge oxide was contained in the second magnetic layer. Further, as can be understood from the result of example 12, it was confirmed that the SNR was a bit lowered when Ge was contained in the first magnetic layer. As can be understood from the result of example 13, it was confirmed that the SNR was a bit lowered when C was contained in the grain boundary portion of the second magnetic layer.

Further, by the comparison of example 18 and comparative example 5, it was confirmed that the SNR was better for the (001) oriented L1$_0$ magnetic layer of example 18 than the (110) oriented magnetic layer of comparative example 5.

According to the magnetic recording medium of the embodiment, SNR can be improved.

Although a preferred embodiment of the magnetic recording medium and the magnetic memory device has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

What is claimed is:

1. A magnetic recording medium comprising:
    a substrate;
    a lower base layer formed on the substrate; and
    a (001) oriented L1$_0$ magnetic layer formed on the lower base layer and including
    a first magnetic layer formed on the lower base layer and having a granular structure of magnetic grains and a grain boundary portion, the grain boundary portion containing C, and
    a second magnetic layer formed on the first magnetic layer and having a granular structure of magnetic grains and a grain boundary portion, the grain boundary portion containing oxide or nitride, the second magnetic layer further containing one or more elements selected from a group consisting of Mg, Ni, Zn, Ge, Pd, Sn, Ag, Re, Au and Pb as an additive,
    wherein the oxide or the nitride contained in the grain boundary portion of the second magnetic layer is selected from a group consisting of SiO$_2$, TiO$_2$, Cr$_2$O$_3$, Al$_2$O$_3$, Ta$_2$O$_5$, ZrO$_2$, BN, Si$_3$N$_4$ and B$_2$O$_3$.

2. The magnetic recording medium according to claim 1, wherein the second magnetic layer does not contain C in the grain boundary portion.

3. The magnetic recording medium according to claim 1, wherein the second magnetic layer does not contain oxide of any of Mg, Ni, Zn, Ge, Pd, Sn, Ag, Re, Au and Pb in the grain boundary portion.

4. The magnetic recording medium according to claim 1, wherein the additive is any of Mg, Ge, Pd and Ag.

5. The magnetic recording medium according to claim 1, wherein an adding amount of the additive in the second magnetic layer is within a range greater than or equal to 0.5 mol % and less than or equal to 20 mol %.

6. The magnetic recording medium according to claim 1, wherein the thickness of the second magnetic layer is within a range greater than or equal to 1 nm and less than or equal to 7 nm.

7. The magnetic recording medium according to claim 1, wherein the (001) oriented L1$_0$ magnetic layer contains FePt alloy or CoPt alloy as a main constituent.

8. A magnetic memory device comprising:
    the magnetic recording medium of claim 1.

9. The magnetic recording medium according to claim 1, wherein the first magnetic layer contains 60 mol % of 50 atomic % of Fe and 50 atomic % of Pt, and 40 mol % of C, wherein the second magnetic layer contains 84 mol % of 45 atomic % of Fe, 45 atomic % of Pt and 10 atomic % of Ge, and wherein the second magnetic layer further contains a composition selected from a group consisting of 16 atomic % of $SiO_2$, 13 atomic % of $SiO_2$ and 3 atomic % of C, 8 atomic % of $SiO_2$ and 8 atomic % of $TiO_2$, and 16 atomic % of $Cr_2O_3$.

10. The magnetic recording medium according to claim 1, wherein the additive is Ge.

* * * * *